United States Patent
Lv et al.

(10) Patent No.: US 12,302,397 B2
(45) Date of Patent: *May 13, 2025

(54) CONTROLLING TRANSMISSIONS FROM MULTIPLE USER DEVICES VIA A REQUEST-CLEAR TECHNIQUE

(71) Applicant: ZTE Corporation, Guangdong (CN)

(72) Inventors: Kaiying Lv, Guangdong (CN); Bo Sun, Guangdong (CN); Kaibo Tian, Guangdong (CN); Weimin Xing, Guangdong (CN); Yonggang Fang, Guangdong (CN)

(73) Assignee: ZTE Corporation, Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,189

(22) Filed: Mar. 13, 2024

(65) Prior Publication Data

US 2024/0306206 A1 Sep. 12, 2024

Related U.S. Application Data

(63) Continuation of application No. 16/857,688, filed on Apr. 24, 2020, now Pat. No. 11,937,299, which is a (Continued)

(30) Foreign Application Priority Data

Aug. 19, 2015 (WO) ................ PCT/CN2015/087562
Nov. 5, 2015 (WO) ................ PCT/CN2015/093886
Dec. 18, 2015 (WO) ................ PCT/CN2015/097864

(51) Int. Cl.
*H04W 74/00* (2009.01)
*H04L 5/00* (2006.01)
(Continued)

(52) U.S. Cl.
CPC ....... *H04W 74/0816* (2013.01); *H04L 5/0051* (2013.01); *H04L 5/0053* (2013.01);
(Continued)

(58) Field of Classification Search
CPC . H04W 74/0816; H04L 5/0051; H04L 5/0053
(Continued)

(56) References Cited

U.S. PATENT DOCUMENTS

2014/0334387 A1 11/2014 Doppler
2016/0014725 A1 1/2016 Yu
2017/0295560 A1 10/2017 Kim

FOREIGN PATENT DOCUMENTS

CN 102892206 1/2013
CN 104254136 3/2014
CN 103686940 12/2014

OTHER PUBLICATIONS

CNIPA, First Office Action for Chinese Application No. 201610693078. 5, with English translation, Jan. 23, 2019.

*Primary Examiner* — Angel T Brockman
(74) *Attorney, Agent, or Firm* — Perkins Coie LLP

(57) ABSTRACT

A method of setup a protection mechanism for scheduled transmissions to multiple stations is introduced. Through transmitting a control frame addressing to multiple stations for immediate simultaneous responses, the transmitter would know the stations that are ready for receiving the scheduled data frames and schedule the packet for those stations. Combining the transmission of the control frame with the power saving mechanism would allow triggering a group of power saving stations to wake up at same for receiving the control frame and scheduled user data frames. A new mechanism of simultaneous group responses to the
(Continued)

control frame with orthogonal identifier information for individual station is provided to uniquely identify the responding stations.

20 Claims, 15 Drawing Sheets

Related U.S. Application Data continuation of application No. 15/237,609, filed on Aug. 15, 2016, now Pat. No. 10,638,516.

(51) Int. Cl.
*H04W 52/02* (2009.01)
*H04W 74/0816* (2024.01)
*H04W 84/12* (2009.01)

(52) U.S. Cl.
CPC ...... *H04W 52/0219* (2013.01); *H04W 74/006* (2013.01); *H04W 84/12* (2013.01); *Y02D 30/70* (2020.08)

(58) Field of Classification Search
USPC .......................................................... 370/329
See application file for complete search history.

CONTROLLING TRANSMISSIONS FROM MULTIPLE USER DEVICES VIA A REQUEST-CLEAR TECHNIQUE

CROSS REFERENCE TO RELATED APPLICATIONS

This application is a continuation of U.S. patent application Ser. No. 16/857,688, filed on Apr. 24, 2020, which is a continuation of U.S. patent application Ser. No. 15/237,609, filed on Aug. 15, 2016, now U.S. Pat. No. 10,638,516, issued Apr. 28, 2020, which claims the benefit of priority under 35 U.S.C. § 119(a) and the Paris Convention of International Patent Application No. PCT/CN2015/087562, filed on Aug. 19, 2015, and International Patent Application No. PCT/CN2015/093886, filed on Nov. 5, 2015, and International Patent Application No. PCT/CN2015/097864, filed on Dec. 18, 2015. The entire contents of the before-mentioned patent applications are incorporated by reference as part of the disclosure of this application.

BACKGROUND

This patent document relates to wireless communication.

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN). The basic unit of WLAN is a basic service set (BSS). The infrastructure BSS is the BSS with stations through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies, among other things, for using multi-user request to send/clear to send (MU-RTS/CTS) to provide reliable multi-users transmissions to improve the medium usage efficiency.

In one aspect, a method is provided for the AP to transmit a MU-RTS frame addressing to multiple STAs to trigger the simultaneous MU-CTS responses so that the AP could schedule the DL or UL transmissions to multiple responded stations accordingly.

In another aspect, a method is provided for stations that are not in the responding list of the MU-RTS frame to decode the MU-RTS frame and set a network allocation vector (NAV) accordingly. Therefore it will prevent other stations interfering with multi-users transmissions in a multi-user transmission opportunity (MU-TXOP).

In another aspect, a method is provided to combine with the power saving mechanism to negotiate the group target wakeup time (GTWT) and to transmit a MU-RTS in the power saving station's wakeup time period so as to trigger a group of power saving stations to receive DL transmissions at same time.

In another aspect, a method of using an orthogonal frequency division multiplexing access (OFDMA) sub-channel to distinguish multiple MU-CTS frames from different stations is provided. With the orthogonal characteristics of OFDMA sub-channels, an access point (AP) can distinguish MU-CTS frames sent from different stations.

In yet another aspect, a method is provided to include an orthogonal sequence in the frame header of MU-CTS frame. Alternatively or additionally, the method may cause to attach the OFDMA symbol(s) at the end of MU-CTS. With the orthogonal sequence, the AP could be able to recognize the individual transmitting station from the multiple simultaneous MU-CTS frames.

In yet another aspect, a novel NAV array protection mechanism is provided to support and protect multi-user transmissions on single 20 MHz channel and/or multiple 20 MHz channels in an overlapping basic service set (BSS).

Details of the above aspects and their implementations are set forth in the accompanying drawings, the description and the claims.

DETAILED DESCRIPTION

Wireless local area communication is fast becoming a popular mechanism for users to communicate with each other via the internet. Growing popularity of wireless devices such as smartphones and tablets means that, often, at crowded places such as airports, sports venues and even within user homes, multiple wireless device may compete with each other for transmitting data to and receiving data from the shared communication spectrum.

In one popular technique, bases on the air interface specified by the Institute of Electrical and Electronics Engineers (IEEE), standard 802.11ac, or 802.11, to be short, and its predecessors, a devices share a transmission medium using certain set of rules. The 802.11 standard defines a Request to Send (RTS) Clear to Send (CTS) protocol in which user devices wanting to send or transmit data first request permission to access the medium for the data transmission, and then transmit only when they receive a green signal, or CTS. A wireless device, or station, that implements the RTS/CTS protocol refrains from sending a data frame until the device completes a RTS/CTS handshake with another device, typically the access point. A station initiates the process by sending a RTS frame. The access point receives the RTS and responds with a CTS frame. The requesting device must first receive a CTS frame directed to itself before sending the data frame. The CTS also contains a time value that alerts other stations to hold off from accessing the medium while the station initiating the RTS transmits its data.

The RTS/CTS protocol, however, is limited to data transmissions between a single transmitting station and a single receiving station. The existing RTS/CTS mechanism cannot accommodate a usage scenario in which multi-user transmissions are permitted in the wireless network. For example, using the existing Request-Clear mechanism, a wireless device that wants to transmit a data frame to multiple nodes simultaneously is not able to solicit permission from multiple devices, all at once, by sending a single message transmission. Similarly, using the current Request-Clear mechanism, wireless devices will ignore transmission requests that are not addressed to them and thus will not respond to multi-user (MU) transmission requests.

This document describes techniques, mechanisms, devices, and systems to protect multi-user transmissions using MU-RTS and MU-CTS to improve transmission reliability and efficiency in contention based wireless communications.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
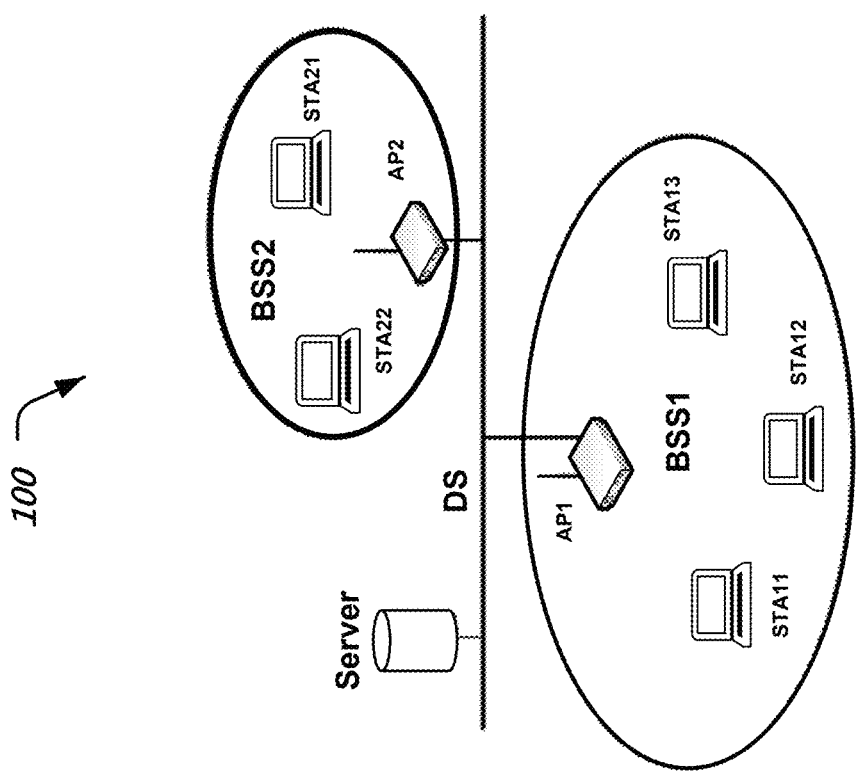
FIG. 1 shows an example of infrastructure BSS in a wireless communication system.

FIG. 1 illustrates an example of infrastructure BSS 100. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server or switch through a distribution system (DS) to form an Extended Service Set (ESS).

Figure 2:
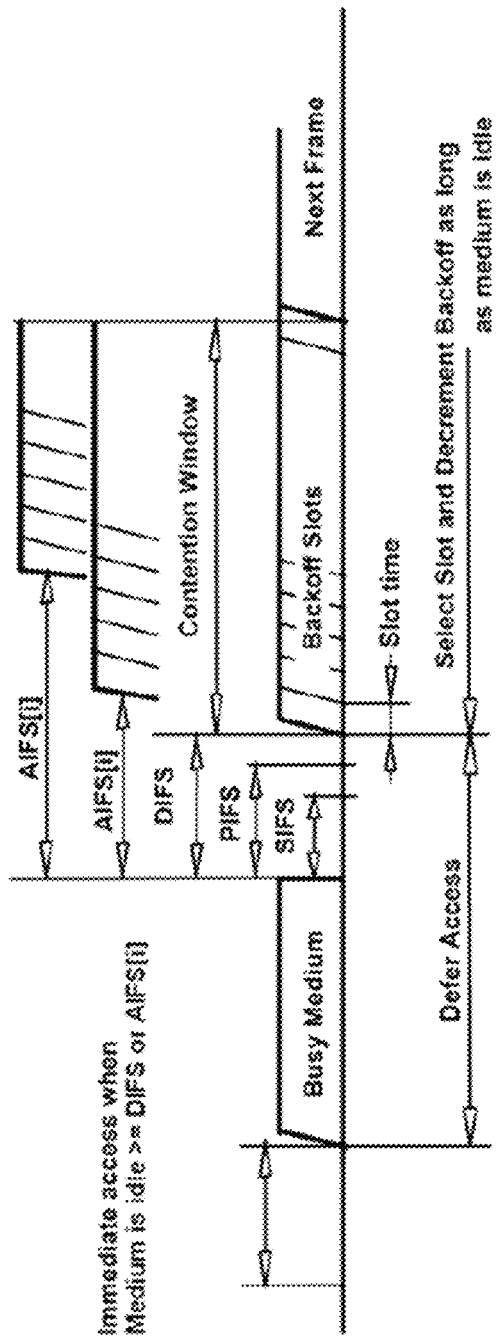
FIG. 2 shows an example of prior art CSMA/CA mechanism in DCF of IEEE 802.11.

IEEE 802.11 is a contention based access mechanism which relies on the carrier sensing algorithm. FIG. 2 illustrates an example of a CSMA/CA mechanism used in the current 802.11 networks. A station senses the medium. If the medium is sensed busy, the station defers until the medium is determined as idle plus a period of time equal to xIFS when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or enhanced interframe space (EIFS) before entering contention window.

In order to prevent from transmission collision and reduce the probability of re-transmissions, the 802.11 specification defines a mechanism of Request To Send (RTS)/Clear To Send (CTS). RTS/CTS are short control frames, which only contain short MAC header. Prior to transmitting large user data, the pair of communicating stations could start with RTS/CTS to acquire the medium occupancy. When other stations receive the RTS/CTS frames not addressing to them, they set their NAV to prevent from transmissions during the period set by the RTS/CTS.

In addition to the purpose of medium occupancy request, RTS/CTS also serve as handshaking between the transmitter and the receiver. If the transmitter sends a RTS but not receives the CTS, the transmitter would cancel the following transmission to the non-responding station and release the TXOP set by RTS. Therefore it reduces the waste of transmission to non-responded station and gives the chance to other stations to acquire the medium again.

Figure 3:
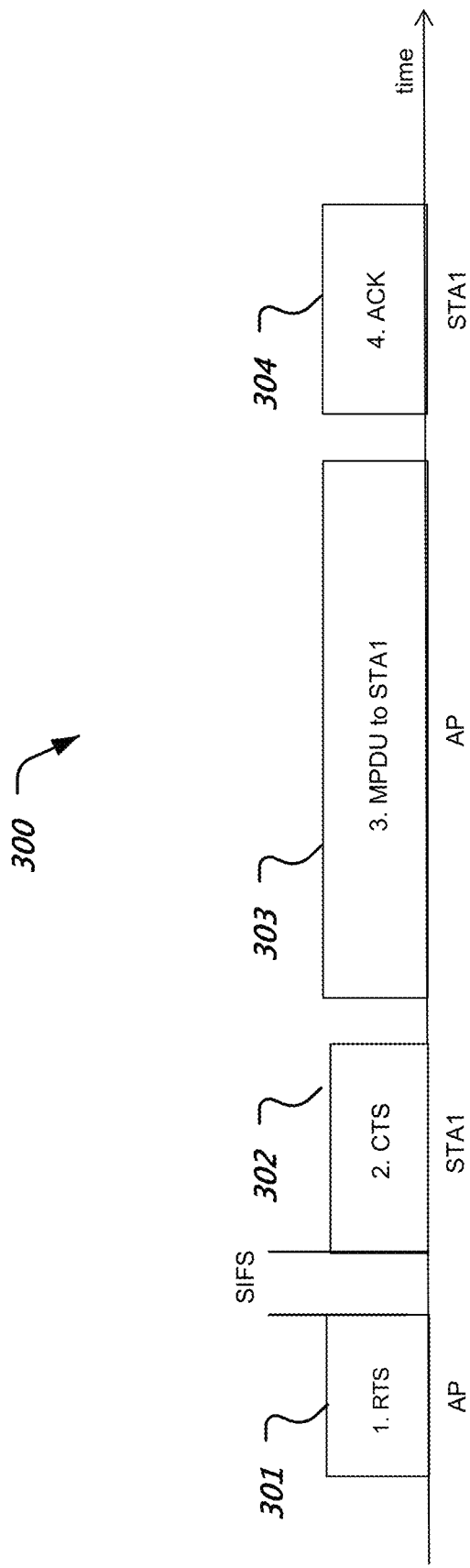
FIG. 3 shows an example of pre-art RTS/CTS in the DL transmission.

FIG. 3 shows an example timeline 300 for using RTS/CTS prior the data transmission between an AP and an STA.

301. When the AP has some data buffered to the STA1, it may send a RTS with RA set to STA1's address to request the communication.

302. The STA1 responds with the CTS in SIFS time after receiving the RTS addressed to it. Other STAs set NAV after receiving RTS/CTS.

303. When receiving the confirmation of CTS, the AP can send DL PPDU frame to the STA1 in the TXOP.

304. The STA1 sends an ACK or BA to the AP once the PPDUS is successfully received.

The existing RTS/CTS protection mechanism is designed and used to protect one-to-one communication. In the multi-user (MU) communications, however, this protection mechanism would have some issues.

As for MU transmissions, for example of DL transmission, the AP may need to specify the MU stations in the RTS so that those specified stations could know and send CTS to the AP. But the current 802.11 specification does not allow specifying a list of stations in the existing RTS frame format.

According to the existing CTS response rules, an STA that receives an RTS frame addressed to it needs to consider the NAV in determining whether to respond with CTS, unless the NAV was set by a frame originating from the STA sending the RTS frame. If the RTS is transmitted using the broadcast RA, all the recipient STAs will reset their NAV values with the Duration field of received RTS frame. All the STAs in the myBSS may respond with CTS concurrently. This may cause two issues:

A) if the NAV value overwritten by the Duration of received RTS is shorter than its original NAV setting, it would make the STA to enter the contention period earlier than that it should.

B) the AP may not able to identify the CTS responses from multiple STAs of myBSS.

When multiple stations respond with multiple CTS at the same time, it may be beneficial to have them use same frame format for MU-CTS. Otherwise, multiple CTS frames that contain different bit patterns would interfere each other over the radio link. On the other hand, the same formatted MU CTS may not be distinguishable when the AP receives them over the air, which causes AP not know whether or not all the recipient stations are ready to receive PPDUs. Due to many operational reasons, some of the stations that are expected to respond with MU-CTS may not send response back. For example, some station may not respond back because they may not have received the MU-RTS due to radio signal fading, or due to a station moving out the coverage area. If the AP blindly schedules DL PPDU transmission to all recipient STAs after receiving a CTS without knowing STA's ID, some PPDUs might be lost as stations are not ready to receive the packets. Therefore those blindly scheduled DL transmissions are wasted, and this reduces spectrum usage efficiency.

In addition, in the most recent version of 802.11ac, the transmissions are allowed to be carried over multiple 20 MHz channels, instead of the single 20 MHz channel. In the current IEEE 802.11 specification, the AP can transmit a RTS to the recipient STA over the primary channel, and duplicate RTS over multiple channels, such as a secondary 20 MHz channel or a second 40 MHz channel. Once the AP receives the CTS response over multiple channels from the STA, it can start the DL transmission over the wideband channel, In the MU DL transmission over multiple channels, the AP may schedule transmitting the PPDUs to each STA over different 20 MHz channel simultaneously ut such transmissions may be blocked according to the current NAV procedure.

Consider, for example, a condition when there are two STAs, called STA1 and STA2, associated with the AP. In general, STA1 and STA2 will have different NAV value depending on its neighboring OBSS traffic condition. Assume STA1's NAV=idle, STA2's NAV=busy on the primary channel. But there is no any traffic over secondary channel. If the AP will schedule the DL transmission for STA1 over the primary channel and STA2 over the secondary channel, and transmit the RTS over both primary and secondary channels, it may only receive the CTS response from STA1 and no response from STA2. This is because the STA2's NAV is set busy for the primary channel. As currently defined in the 802.11 specification, the STA should not send the response if its NAV is busy. Therefore for the STA2, even the secondary channel that the transmission is scheduled on is not busy, it cannot respond with CTS on the secondary channel to accept the scheduling of AP.

To solve these issues in MU transmissions, and others, this document discloses a new RTS/CTS mechanism for protecting and confirming the scheduled DL MU transmissions over single 20 MHz channel or multiple 20 MHz channels. In some embodiments, the AP uses the MU-RTS frame to request setup MU-TXOP with MU stations. With confirmation of MU-CTS from multiple stations, the AP could then schedule DL transmissions to those stations. Therefore it would reduce the PPDU loss caused by blindly scheduling in the DL transmissions.

In some embodiments, a MU-RTS could have short format, which would reduce the signal overhead in the frame exchange for setup MU-TXOP.

In some embodiments, a MU-RTS could be used in or combined with the power saving (PS) mechanism. In order to save the power of devices, a power saving station negotiates with the AP the target wakeup time (TWT) so that those PS stations could wake up at TWT serving period and sleep at other times. In this way, the station would save power consumption. During the TWT SP, the AP could use MU-RTS to trigger MU-CTS responses so that it can schedule multiple DL transmissions to those responded stations accordingly.

In some embodiments, the MU-RTS could use long format so that AP could directly include the list of stations and page them to respond with MU-CTS. The long formation of MU-RTS provides more flexibility for the AP to request MU-TXOP and schedule DL MU transmissions.

In some embodiments, a NAV array protection mechanism is used to handle multi-user transmissions in overlapping BSS on single 20 MHz channel and/or multiple 20 MHz channels.

This document also discloses a new format of MU-CTS using orthogonal identifier to distinguish individual STA. In the MU-CTS frame format, the first part is identical in each frame sent from different STA. The orthogonal identifier in the MU-CTS is used for AP to identify individual STA.

In some embodiments, orthogonal sequence could be a code like Zadoff-Chu or training sequence like HE-LTF (high efficiency long training field) transmitted over OFDMA sub-channel.

Figure 4:
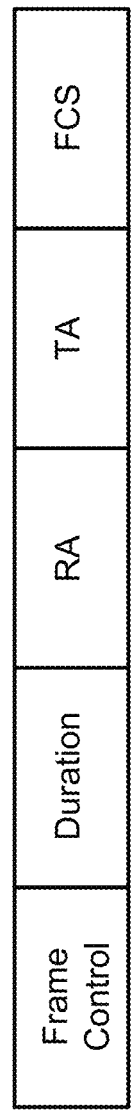
FIG. 4 shows an example of short format of MU-RTS frame.

FIG. 4 shows an example of a short format of MU-RTS frame 400.

The short format of MU-RTS frame is same as legacy RTS frame format so that it would provide full backward compatibility to legacy stations and less signaling overhead to setup MU-TXOP. The difference between MU-RTS and legacy RTS is the Receiving Address (RA) field of MU-RTS to be set to the Group Address (GA) which is assigned to Group with same TWT during the association or negotiation between AP and TWT STA. All the STA within GTWT group may wake up at the same to listen to the transmission from the AP.

To schedule DL MU transmissions, the AP transmits a short format MU-RTS to acquire MU-TXOP and poll the group of STAs with the same TWT. All the STAs with the GA will respond with MU-CTS in the same frequency channel as MU-RTS transmission, so that the AP would know which stations with the same GA are ready to receive the PPDUs in the MU-TXOP.

When a HE STA (high efficiency station) receives a MU-RTS, it first checks whether the RA field matches its own MAC address. If not, the HE STA needs to further check whether the RA field matches its Group TWT GA. If this second check results in a match, the HE STA sends a MU-CTS in SIFS time. Otherwise, the HE STA sets NAV according to the Duration field of MU-RTS.

When legacy STAs receive the MU-RTS, they will treat it as regular RTS since the RA field does not match their MAC address or TWT group address, and will set NAV to prevent from access the medium during the MU-TXOP.

Figure 5:
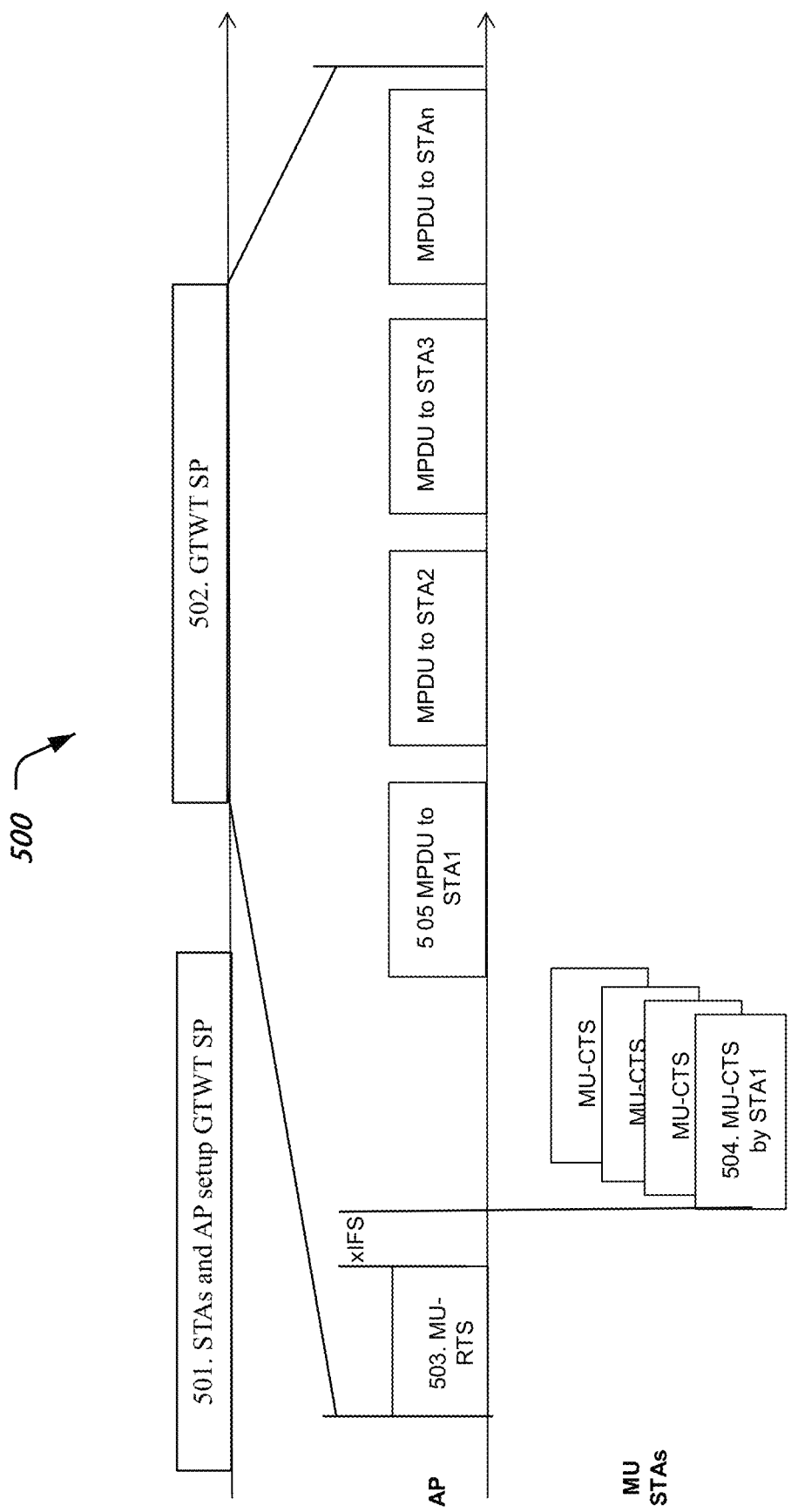
FIG. 5 shows an example of using short frame format of MU-RTS in GTWT service period.

FIG. 5 shows an example timeline 500 for using the short format of MU-RTS in Group TWT SP.

501. During the association process, the STA and AP can negotiate with Group TWT (GTWT). The TWT requesting STA may propose a GTWT to the AP. The TWT responding STA, e.g., AP, may provide an explicit GTWT SP starting times that are in periodic or aperiodic manner in the TWT response message to confirm GTWT setting with the TWT STA. The AP may assign a GTWT Group Address to the STA so that the AP can group STAs with same or similar TWT together and use GA to page the TWT STAs to receive DL PPDUs.

In order to support distinguishable MU-CTS, the AP may assign an orthogonal identifier (OID) to each TWT STA in the GTWT group. The orthogonal identifier could be a sequence like Zadoff-Chu sequence, training sequence like HE-LTF sequence transmitted over OFDMA sub-channel, the index of OFDMA sub-channel or other type of orthogonal sequence. This orthogonal identifier sequence will be sent with other fields of MU-CTS which are identical for all TWT STAs, and used for the AP to identify the responding STA.

After association, either TWT STA or AP could re-initiate TWT message exchange to set a new GTWT.

502. When in GTWT SP, the AP checks whether there are some buffered data for TWT STAs that will wake up at GTWT SP.

503. The AP transmits a short format MU-RTS to GTWT stations with RA=GA to trigger the GTWT STAs to send MU-CTS simultaneously back to the AP. The AP may implicitly indicate to respond with MU-CTS when GTWT STAs receive the short format MU-RTS.

504. After receiving MU-RTS, the GTWT STA performs the following:
 a) check whether the RA of MU-RTS is equal to the its MAC address. If yes, it is a regular RTS and processes it accordingly.
 b) otherwise, check whether the RA of MU-RTS is the same as GA of GTWT group that the GTWT STA belongs to. If yes, the GTWT STA should send the MU-CTS back to the AP.
 c) otherwise, set the NAV for the duration indicated in the Duration field of MU-RTS.

505. Once receiving the MU-CTS from GTWT STAs, the AP will schedule the DL transmissions to responded GTWT STAs in MU OFDM, OFDMA or MIMO mechanism. The AP will not schedule the DL transmissions to the stations which their MU-CTS responses are not received. FIG. 5 shows an example of transmission in OFDM mechanism.

Figure 6:
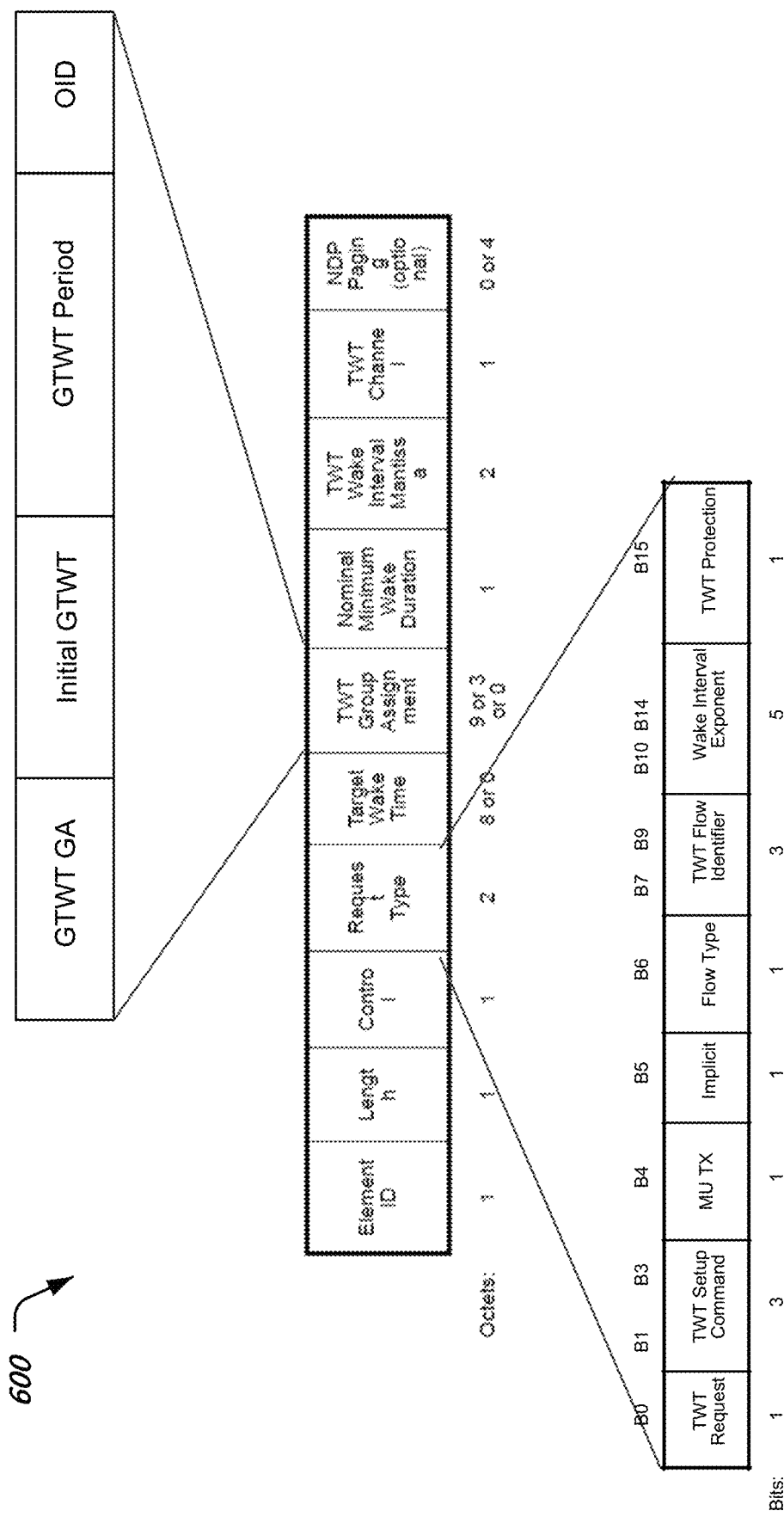
FIG. 6 shows an example of proposed TWT IE for MU-RTS/CTS setup.

FIG. 6 shows an example 600 of using TWT information element for setup of configuration information required by MU-RTS/CTS transmission.

In the Request Type field of TWT IE (information element), one bit can be used to indicate the TWT is used for MU transmissions. Once the Request Type field is set to "1", the TWT Group Assignment field would be used to configure for MU transmissions.

The TWT Group Assignment field contains the information to a requesting STA about the GTWT group to which the STA is assigned. This field contains the GTWT GA, Initial GTWT, GTWT Offset and Orthogonal ID field.

GTWT GA subfield contains the Group Address to which the requesting STA is assigned to. The STAs with the same GTWT GA wakes up at same time to listen to the transmissions from the AP.

Initial GTWT sub-field contains the lowest 6 octets (for example) of the TSF time corresponding to the GTWT.

GTWT Period sub-field contains the value of period at which GTWT STAs wake up. If GTWT Period sub-field is set to 0, that means the GTWT is aperiodic. Otherwise GTWT for the group can be calculated as Initial GTWT+ n×GTWT period, where n=0, 1, 2, . . . .

The Orthogonal ID (OID) sub-field contains the distinguishable identifier in the group that the requesting STA uses in the UL MU transmission, such as in the MU-CTS transmission. The OID could be an index of orthogonal sequence like HE-LTF, or an index of OFDMA sub-channel (resource block).

Figure 7:
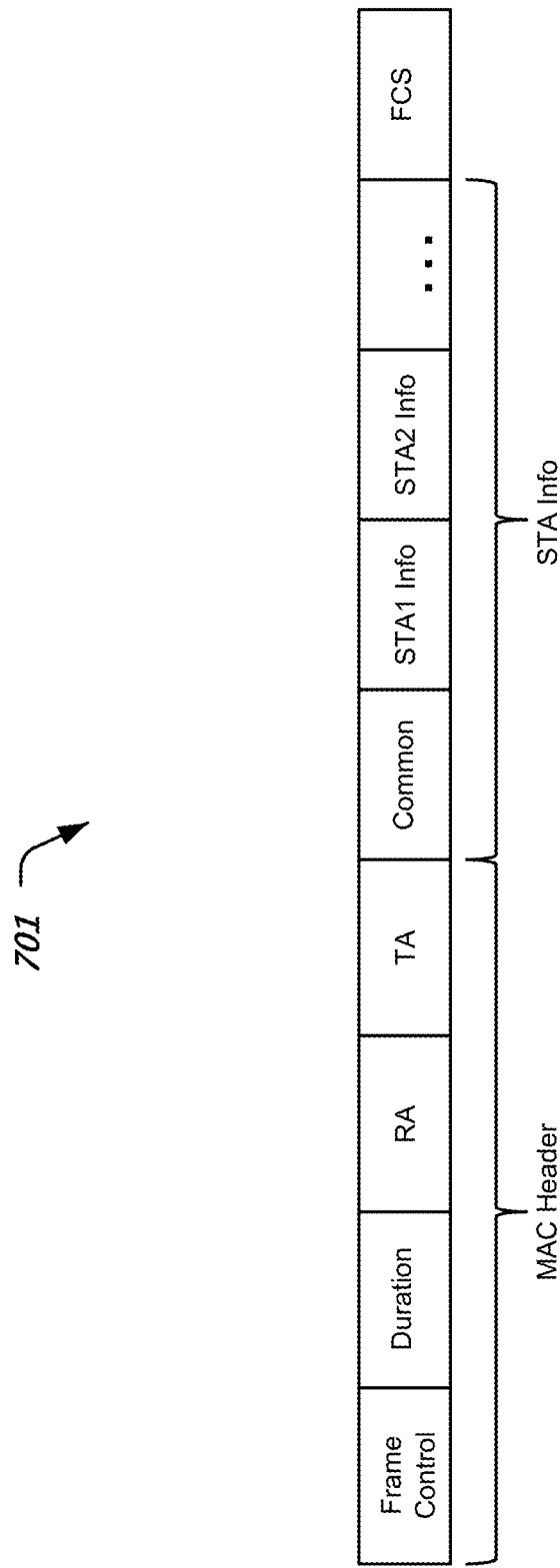
FIG. 7 shows an example of long format of MU-RTS frame.

FIG. 7 shows another example 701 of MU-RTS frame with long format.

The long format of DL MU-RTS consists of a legacy part and an extended part, which allows the AP to include the STAs' information directly in the MU-RTS frame to trigger the MU-CTS responses simultaneously.

The legacy part of MU-RTS is same as RTS frame header, including Frame Control, Duration, RA and TA. RA field is set to TA, i.e. RA=TA=AP MAC address. When the legacy STA receives a long format MU-RTS frame, it would be able to decode the legacy part of MU-RTS and use it to set NAV.

When a HE station receives MU-RTS, it could use RA=TA and FC field to distinguish MU-RTS from the RTS, and further decode the extended part of MU-RTS. The extended part of MU-RTS provides the information of STAs that are to respond to this MU-RTS with MU-CTS, which includes common field and per-STA info field.

1. The common field contains the response frame type: i.e. MU-CTS explicitly, and the length of per-STA information fields. If the common field of MU-RTS does not include response frame type, it indicates implicitly that the response to the MU-RTS should be MU-CTS via the Per-STA information of MU-RTS. For example, if the Per-STA information of MU-RTS contains OID (such as OFDMA sub-channel index or orthogonal sequence ID), then it implies the response frame will be MU-CTS.

2. Per-STA info field contains AID (association identifier) and OID of station, for example (fields STA1 info, STA2 info, and so on).

If a HE STA receives a MU-RTS and finds its AID in the list of station information of MU-RTS, the HE STA sends the MU-CTS to the AP. Otherwise, a HE STA that is not in the STA list of the MU-RTS sets NAV according the Duration information of MU-RTS.

If the Per-STA information field of MU-RTS contains AID only, then it implies the response frame will be in the legacy format of CTS. The recipient STA should send a CTS frame over the primary 20, 40 or 80 MHz channel depending on the carry sensing result on those channel after receiving MU-RTS.

If the Per-STA information field of MU-RTS includes AID only, and sets AID=0, it means the following MU TXOP is for MU random access. The AP may further indicate in MU-RTS the total Resource Units (RU) allocated for the following MU random access TXOP. When the STA that needs to send UL PPDUs or messages receives the MU-RTS frame, it may respond with a legacy format CTS to reserve its future transmission opportunity if it can estimate to have a chance to transmit UL PPDUs or messages in following MU random access period based on the received information in the MU-RTS. The STA may not need to respond with CTS for the MU TXOP protection if
 A) it does not have an UL PPDU or a message to send, or
 B) its random access backoff counter is greater than the total number of allocated RUs, or
 C) the RSSI measurement of receiving signal is greater than the given threshold.

In order to make the MU-CTS distinguishable when the AP receives multiple MU-CTS from different HE STAs, it may be useful to include an orthogonal identifier in each MU-CTS frame format. There might be two possible ways to include orthogonal identifier in the MU-CTS frame:
 1. Using orthogonal sequence in the PHY header to distinguish the STA.
 2. Using OFDMA sub-channel to carrier STA related information. The OFDMA based STA info could be carried in either HE frame format or attached to the end of legacy CTS frame to form a MU-CTS.

Figure 8A:
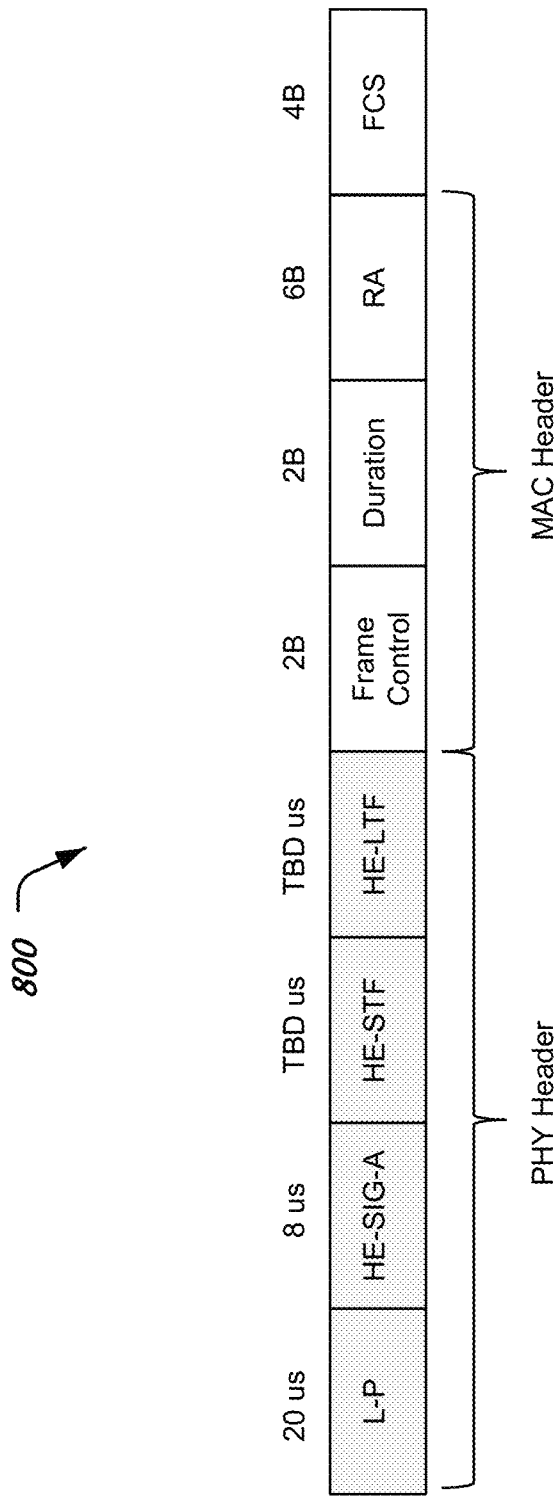
FIG. 8A shows an example of MU-CTS frame format with orthogonal sequence.

FIG. 8A shows an example of MU-CTS frame format with orthogonal sequence. The MU-CTS frame may consist of:
 a) Legacy preamble: L-STF, L-LTF and L-SIG fields
 b) HE preamble: HE-SIG-A, HE-STF and HE-LTF fields
 c) MAC header: including FC, Duration, and RA The legacy preamble field, like L-STF, L-LTF and L-SIG fields of MU-CTS would be set to fixed values for backward compatible and used by the AP and other STAs for the timing and frequency synchronization and CCA detection so as to protect the MU-TXOP from legacy stations not to contend the medium when legacy stations and HE stations were deployed in the same area and on the same frequency channel.

Since all the responding HE STA use the identical settings in L-SIG of MU-CTS frame, legacy preamble fields transmitted from multiple stations would be same. This transmission characteristic can be advantageously used by the AP or the other station to simply treat the received signal as a multi-path from a single source. In other words, when multiple stations transmit the legacy preamble of MU-CTS at same time, no additional reception challenged is faced by receiving modules of the AP or another receiver, which typically are designed to mitigate effects of multipath and decode received signal.

HE preamble fields shown in FIG. 8A may be used to carry the HE frame format information and training sequences. HE-SIG field could be transmitted over entire 20 MHZ bandwidth, while HE-LTF training sequence could be transmitted over one OFDMA sub-channel specified by OID. As orthogonal characteristic of OFDMA sub-channel, HE-LTF training sequence could be used to identify an individual STA uniquely by AP when receiving MU-CTS.

Figure 8B:
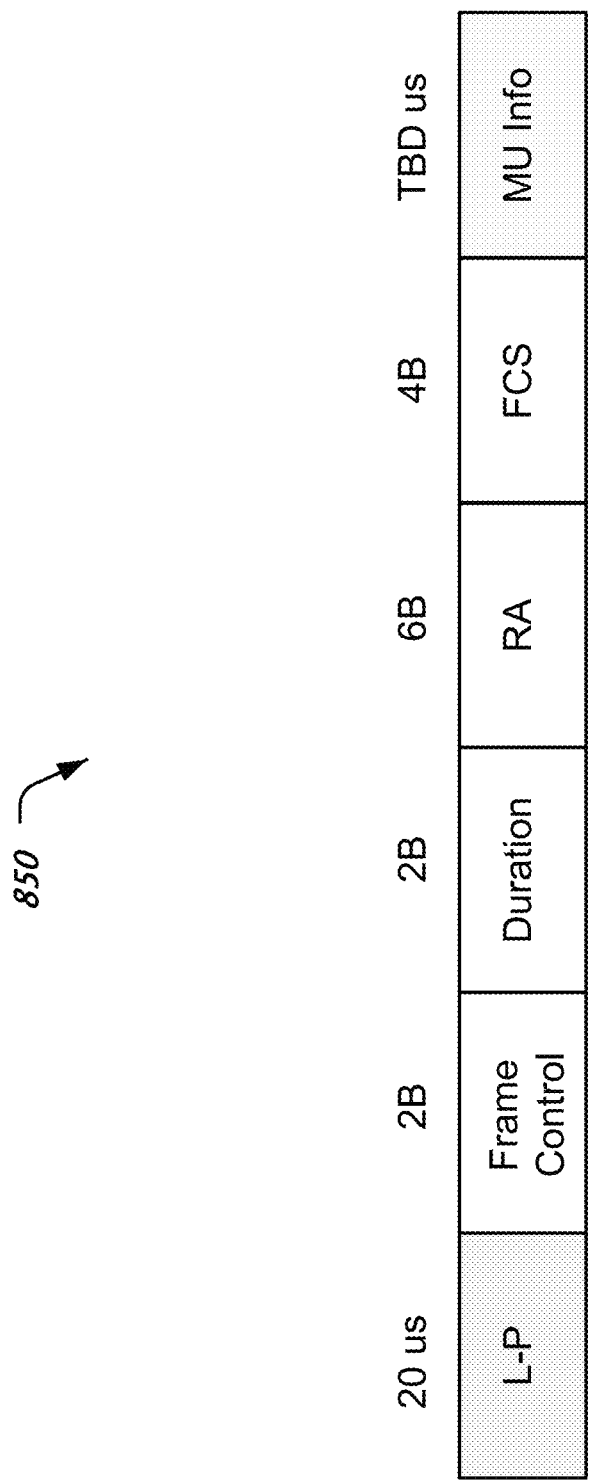
FIG. 8B shows an example of MU-CTS frame format with individual STA information carried over OFDMA sub-channel.

FIG. 8B shows another example of MU-CTS frame format 850 (option 2). In this option, the MU-CTS format contains:
a) legacy preamble: L-STF, L-LTF, L-SIG
b) legacy MAC header; FC, Duration, RA, FCS, which are transmitted over 20 MHZ bandwidth.
c) MU information field attached at the end of legacy frame portion and transmitted over OFDMA sub-channel.

The legacy preamble field and MAC header of MU-CTS are same as the legacy CTS frame format. The transmission of MU-CTS can follow the rule of legacy CTS.

The MU information field of MU-CTS is transmitted in OFDMA symbol(s). It can be HE-STF, HE-STF+HE-LTF, or HE-STF+special orthogonal sequence. It may also be used to carry the information about the individual STA such as buffer status, OFDMA sub-channel measurement information, etc. As MU Information is transmitted over an OFDMA sub-channel specified by OID, the AP may use the sub-channel itself to identify the STA.

When either a legacy or HE STA receives the MU-CTS frame, it processes it exactly same as receiving a legacy CTS frame. Due to the HE MU information is added at the end of MU-CTS frame, the legacy or HE STA may treat it as padding and ignore it. When the AP receives the MU-CTS, it can use the MU information to distinguish which STA responds to its MU-RTS, and proceeds the transmissions to those responded STAs accordingly.

In order to protect the MU transmissions over multiple 20 MHz channels, a NAV Array may be used in some embodiments. The use of an array (instead of a single vector) thus allows each STA to maintain multiple NAV timers. In some embodiments, the number of NAV timers maintained in the NAV array may be equal to the number of (20 MHZ) channels that are being used in the wireless system. In such embodiments, each NAV timer in the NAV Array is responsible to track the NAV setting for a corresponding 20 MHz channel. All the NAV timers are updated based on the received PPDUs on primary channel.

For example, in some embodiments, the NAV Array is used to track four 20 MHZ channels, i.e., 80 MHz bandwidth. If an PPDU is received for the entire 80 MHz channel, then all the NAV timers on the four 20M channels update their value accordingly. If a PPDU is received over 40 MHz channel, two NAV timers, one for the primary 20 MHz and one timer for a secondary 20 MHz channel, will be updated according to the received PPDU Duration. However, the NAV timers for each 20M channel on secondary 40M will remain the current values without changes.

In order to differentiate NAVs for multiple BSSes in overlapped deployment cases, a STA may maintain a multiple NAV Arrays, each of the NAV Arrays corresponding to the virtual channel sensing of one BSS in the overlapped deployment case, and identified by BSSID or the Color Code of the BSS.

In order to assist a STA to detect the channel condition over multiple 20 MHZ channels, a PPDU transmitted over multiple channels may carry the Channel Usage Indication (CUI) in the header of PPDU to indicate the channel occupancy condition of each 20 MHz channel over the entire band. For example, when the transmitting STA occupies four 20 MHZ channels, it can set the CUI=0x00001111 in the header of PPDU, which means the lower four 20 MHz channels in the 160 MHz bandwidth are occupied (as indicated by 1's in those positions). When a STA receives a PPDU with the above CUI, it can know the channel availabilities and set the corresponding NAV timer for that channel of the NAV Array for that BSS.

Figure 9A:
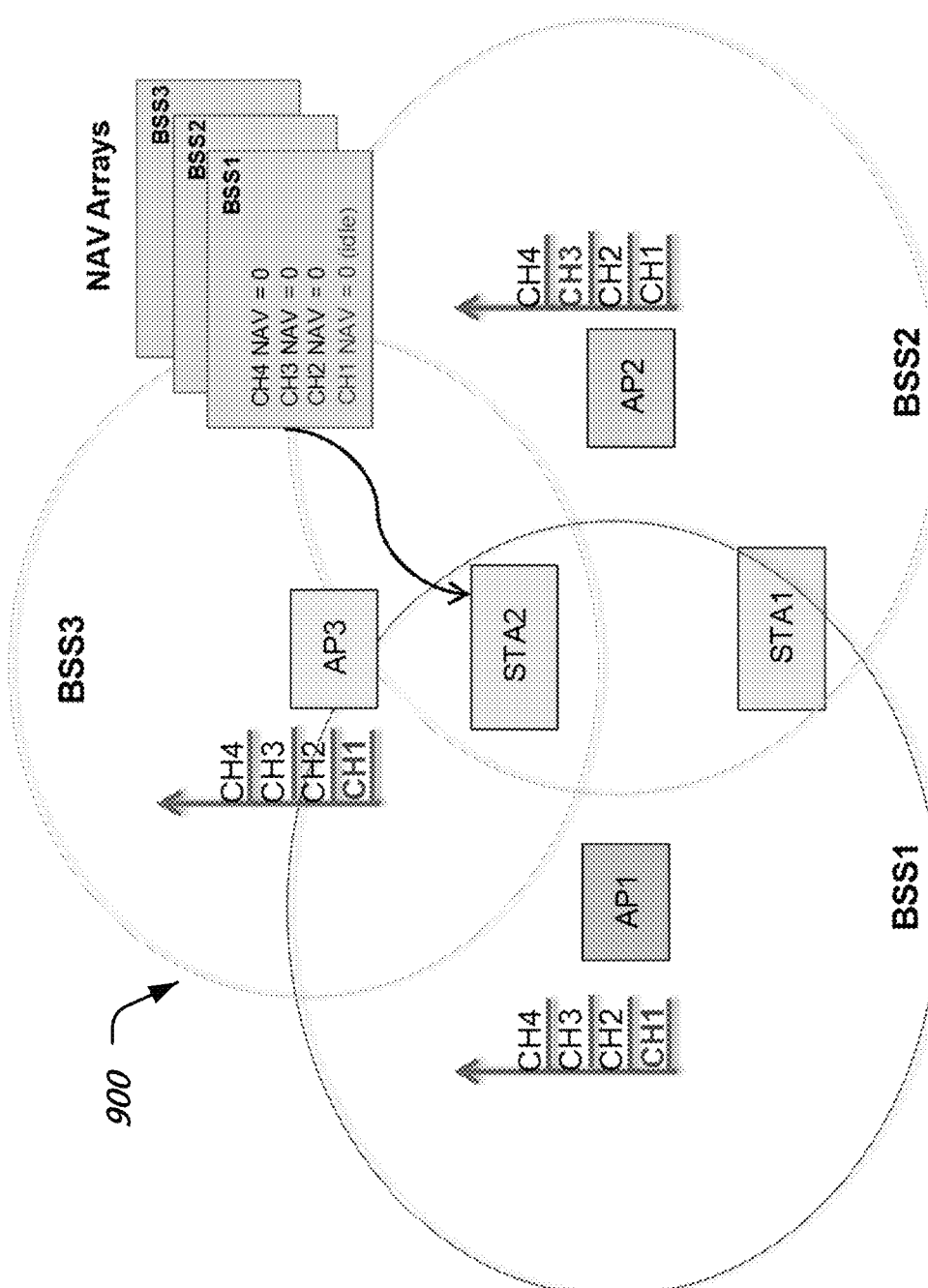
FIG. 9A shows an example of using NAV Array to protection MU transmission over multiple channels in over-lapped deployment.

FIG. 9A shows an example of NAV Array in multiple 20 MHz channels deployment case. The example system 900 shows that there are three BSSes in the overlapped area, BSS1, BSS2 and BSS3. The AP1 of BSS1 is operating on 80 MHz channels including four 20 MHZ channels: CH1, CH2, CH3 and CH4. The CH1 is the primary channel of 20 MHz. The AP2 of BSS2 is also operating on 80 MHz channel. But its primary 20 MHz channel is on CH3. The AP3 of BSS3 is operating on 80 MHz channel as well. Its primary 20 MHz channel is on CH1, the same as BSS1.

In the system 900, two STAs, STA1 and STA2, are associated with BSS1, but STA1 can receive the signals from BSS2, and STA2 can receive the signals from both BSS 2 and BSS3 in addition to BSS1. The STA1 may maintain the NAV Arrays for BSS1 and BSS2, each of which contains a NAV for each 20 MHz channel in 80 MHz bandwidth. The STA2 may maintain the NAV Arrays for BSS1, BSS2 and BSS3, each of which contains a NAV for each 20 MHz channel in 80 MHz bandwidth.

Figure 9B:
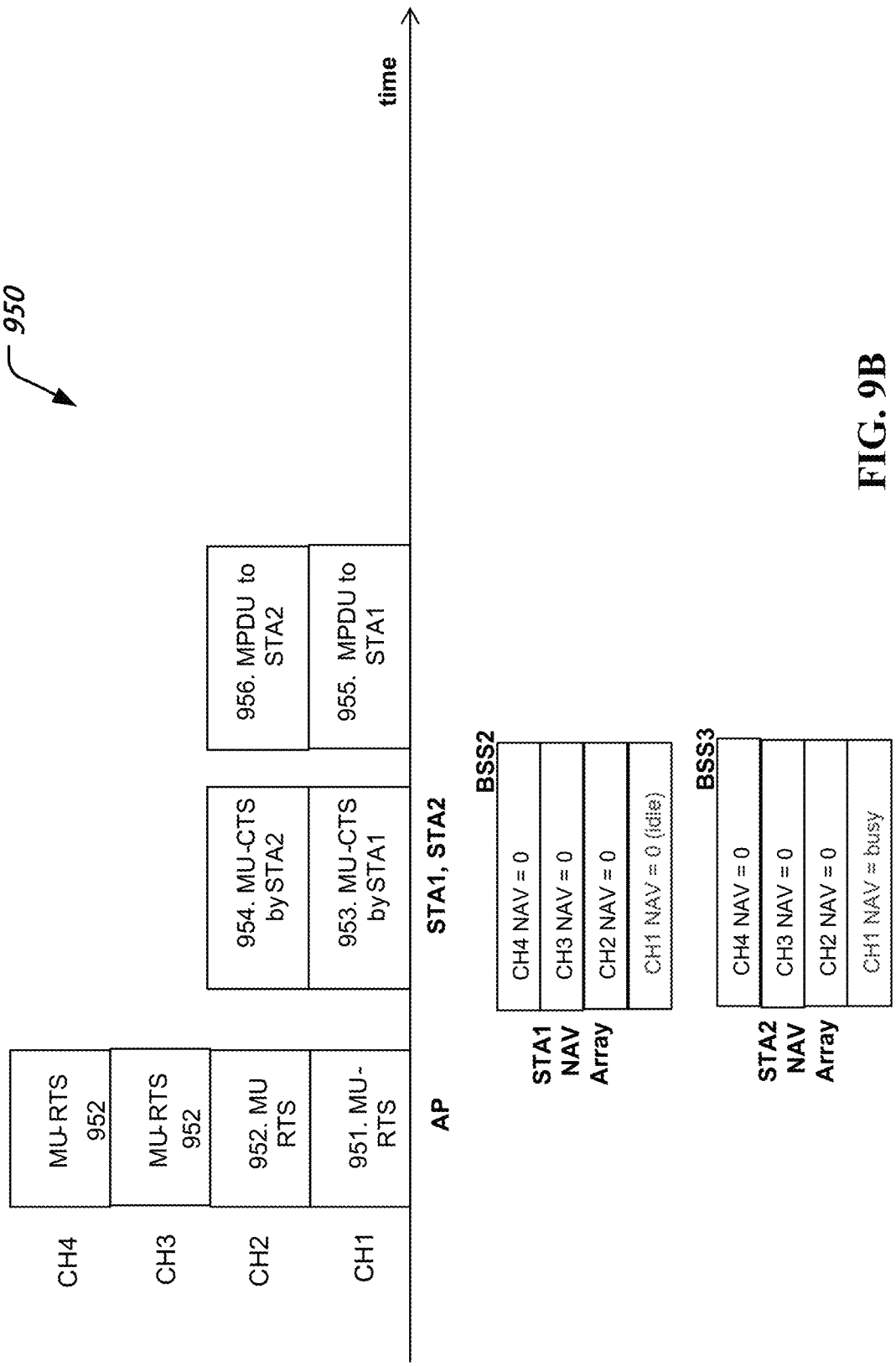
FIG. 9B show an example of transmission MU-RTS over multiple channels.

FIG. 9B shows an example 950 of transmitting MU-RTS/MU-CTS to protect MU transmissions over multiple 20 MHz channels.

951. The AP transmits the MU-RTS with broadcast RA on the primary 20 MHz channel of CH1 and may carry the Channel Usage Indication in PPDU to indicate occupancy of four 20 MHz channels.

952. The AP duplicates same MU-RTS over each 20 MHz channel of CH2, CH3 and CH4. The AP may indicate the recipient STAs either using short format or long format of MU-RTS. The AP may also indicate the recipient STAs the type of transmission in the following TXOP, such as dedicated transmissions or MU random access.

953. The recipient STA1 listens to the primary channel CH1 and receives the MU-RTS. Before responding to MU-RTS, STA1 checks each NAV timer value in the NAV array for other overlapping BSSes, e.g., BSS2, only as the origination of MU-RTS frame is from myBSS. As the STA1 is overlapped with BSS2 only, which has no transmission going on over BSS2, therefore the NAV for CH1 indicates idle, In addition, other NAVs of STA1's NAV Array for BSS2 also indicate the secondary channels free. So the STA1 can respond an MU-CTS over the primary channel CH1.

954. The recipient STA2 also receives the MU-RTS over the primary channel CH1. It checks its NAV arrays of additional BSSes to which it belongs, e.g., BSS2 and BSS3, to determine the response of MU-CTS. As some transmissions are going over BSS3, the NAV of STA2's NAV Array for BSS3 shows primary channel busy. But the secondary channels are indicated as idle in STA2's NAV Array for BSS3. Therefore STA2 sends a MU-CTS over the secondary 20 MHz channel CH2 (and not CH1) to prevent interference to the current communications over the CH1 in BSS3.

955. After receiving the MU-CTS responses from STA1 and STA2, the AP schedules the DL PPDU transmissions over CH1 and CH2 individually so that both STA1 and STA2 can receive their PPDU over different 20 MHz channel independently without interference to existing communications in other BSS.

With NAV Arrays mechanism, the AP can schedule and protect the MU transmissions to MU STAs over multiple 20 MHz channel simultaneously without interference to the existing communication on OBSS.

Figure 10:
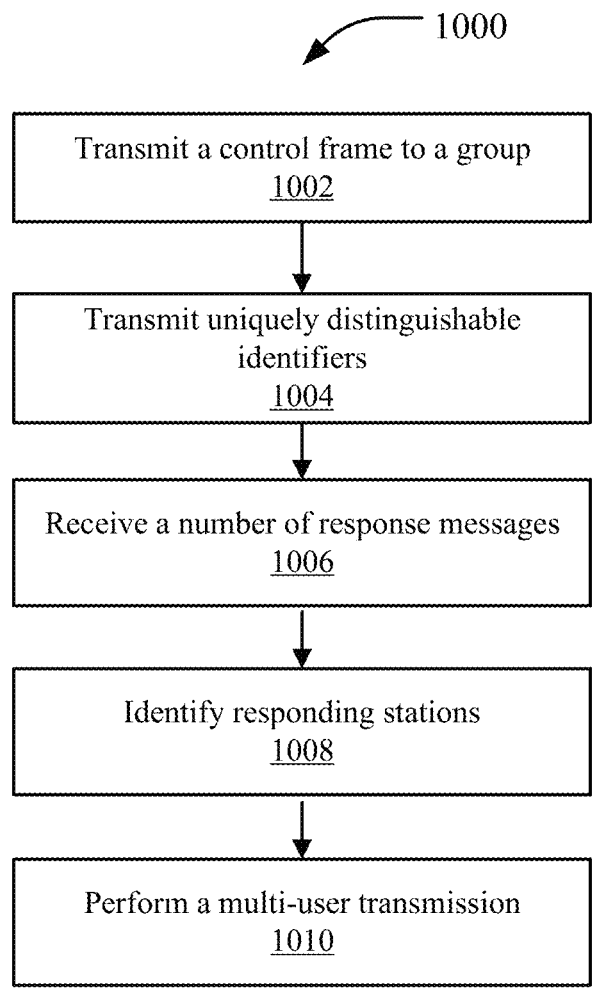
FIG. 10 shows an example flowchart for a method of wireless communication.

FIG. 10 shows an example flowchart of a method 1000 of controlling operation of a wireless network comprising an access point and a plurality of stations. The method 1000 may be implemented, e.g., at an AP.

The method 1000 includes, at 1002, transmitting a control frame comprising information of a group of stations from the multiple stations, thereby requesting simultaneous responses to the control frame. As described herein, and depicted, e.g., in FIG. 6, FIG. 7, the control frame may include one or more of the following fields: a frame control field, a duration field, a receiving address (RA) field, a transmitting address (TA) field indicating an identity of the access point, and a list of group stations field.

In some embodiments, the group of stations includes stations that have the same target wakeup time. Individual target transmission times may vary by a few inter-frame gap periods. Similarly, not all stations that have the same target wakeup time may be included in a given group, e.g., it may be necessary to have a same wakeup time, but not sufficient. The method 1000 may include setting the RA field to indicate the group of stations so as to trigger the group of stations to respond the control frame simultaneously within a pre-determined time interval.

In some embodiments, the method 1000 may include setting the RA field to TA and separately including a listing of the group of stations to trigger those stations to respond the control frame simultaneously. The listing may be included in the same frame transmission or may be included in a different transmission. For example, the wireless network may, from time to time, include control message transmissions that identify group members.

The method 1000 includes, at 1004, transmitting uniquely distinguishable identifiers for each station in the group of stations. The uniquely distinguishable identifier may be a unique sub-channel of OFDMA transmission assigned to each group. In some embodiments, e.g., as described herein, an orthogonal training sequence may be assigned to each member station of a group to uniquely identify the station.

The method 1000 includes, at 1006, receiving, at a same time, a number of response messages to the control frame over the same channel on which the control frame was transmitted. In some embodiments, the reception may be performed by monitoring a wireless channel for a legacy preamble, decoding one or more response frames when the legacy preamble is detected, and identifying the responding stations from the uniquely distinguishable identifier included in the received responses. The legacy preamble may include a legacy short training field, a legacy long training field and a legacy signal field.

The method 1000 includes, at 1008, identifying, for each response message, a corresponding station in the group of station that transmitted the response message based on the corresponding station's uniquely distinguishable identifier.

The method 1000 includes, at 1010, performing a multi-user transmission to those stations which responded to the control frame. As described in the present document, by restricting transmission only to stations that have responded, wastage of the transmission resources can be mitigated.

Figure 11:
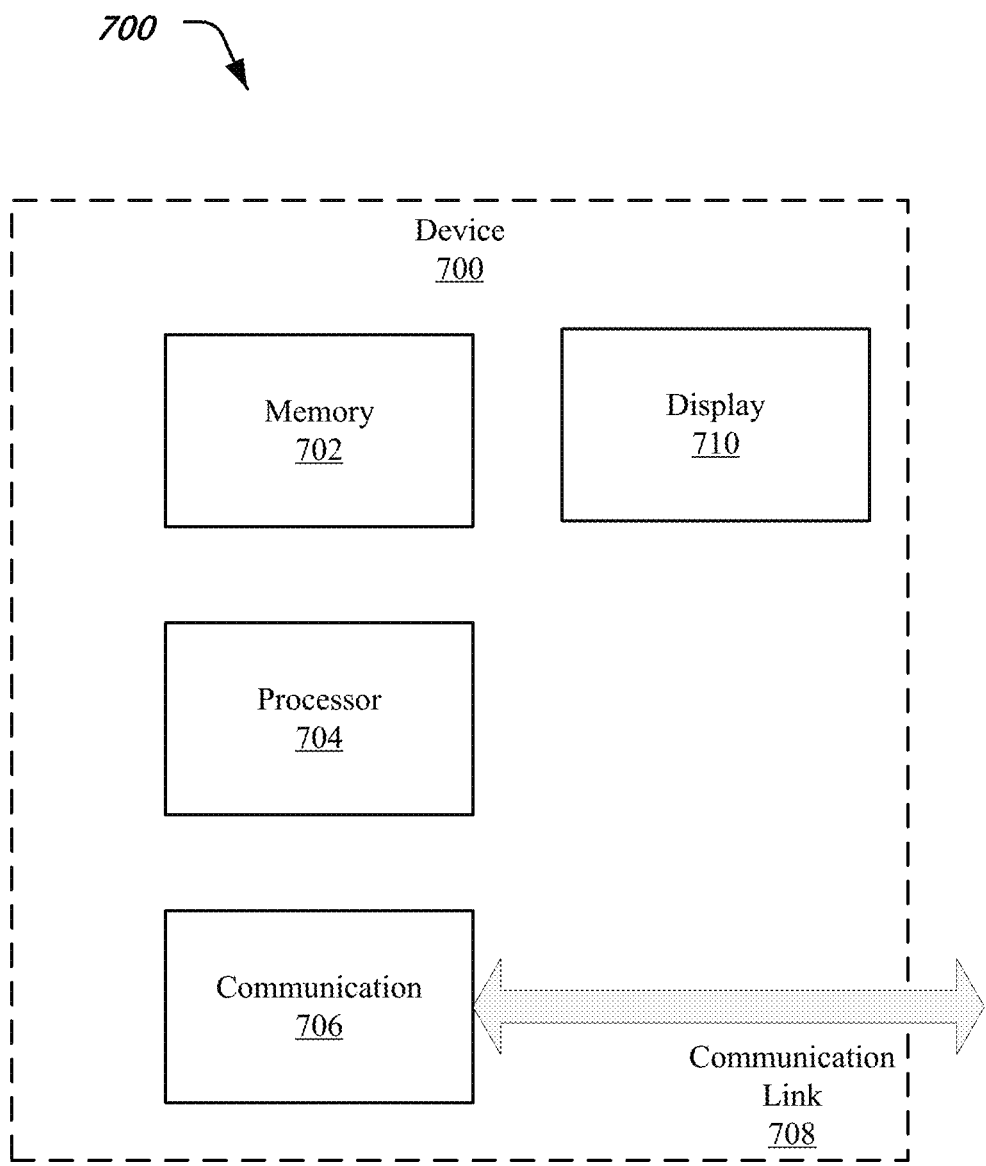
FIG. 11 shows an example block diagram of a wireless communication apparatus.

FIG. 11 shows an example of a device 700 which could be used to implement some of the techniques disclosed in the present document. The device 700 may be used, e.g., to use an access point. The device 700 includes memory 702, a processor 704 and a communication module 706, e.g., for access the wireless medium. The memory 702 may store program code or data during operation of the server 700. The program code may be read by the processor 704 to implement methods described in the present document. The device 700 may optionally include a display module 710 that may provide information to a display user interface for an operator to control the operation of the device 700.

In some embodiments, a method of wireless communication, implemented at a wireless station may include receiving a control frame comprising information of a group of stations from the multiple stations in the network, parsing the control frame to locate whether the control frame is directed to the station, receiving a uniquely distinguishable identifier for the station from the group of stations, transmitting a response message in response to the control frame, wherein the response message is transmitted at a same time as other stations in the group of stations. The response message also includes the uniquely distinguishable identifier for the station.

Figure 12:
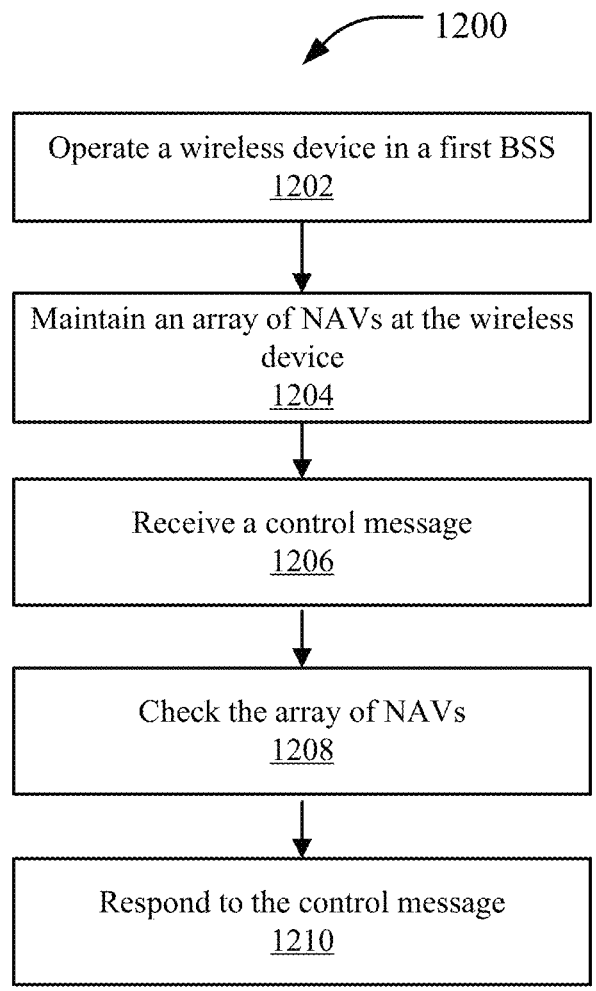
FIG. 12 is a flowchart of an example method of wireless communication implementation at a wireless station.

FIG. 12 is a flowchart representation of an example method 1200 of wireless communication performed by a wireless device such as a wireless station.

The method 1200 includes, at 1202, operating the wireless device in a first basic service set (BSS) in which wireless transmissions use a broadband wireless channel comprising multiple lower bandwidth channels.

The method 1200 includes, at 1204, maintaining, at the wireless device, an array of network access vectors (NAVs) in which each NAV comprises a timer scheme for performing virtual carrier sensing on a corresponding lower bandwidth channel.

The method 1200 includes, at 1206, receiving, from an access point of the first BSS, a control message for responding to the access point with a channel occupancy status message.

The method 1200 includes, at 1208, checking one or more NAVs corresponding to one or more lower bandwidth channel identified by the control message.

The method 1200 includes, at 1210, responding to the control message based on indication of channel occupancy from the one or more NAVs. The response may be, e.g., a clear-to-send indication only when all channels have no activity, e.g., as explained with respect to FIGS. 9A and 9B. In some embodiments, the response may be transmitted over one of the lower bandwidth channels that is not currently being occupied or not in use by other transmissions in the BSS.

In some embodiments, the method 1200 further includes maintaining, at the wireless device, another array of NAVs corresponding to a second BSS in which the wireless device is operating, and wherein the checking one or more NAVs includes checking one or more NAVs of the another array. Thus, a wireless device such as a STA in the wireless network may thus maintain multiple arrays of NAVs, one per each BSS, and entries in each array corresponding to the sub-channels (e.g., 20 MHz channels or 40 MHz channels) that make up to total high bandwidth channel. Thus, in some embodiments, at least some of the lower bandwidth channels may have different bandwidths.

In some embodiments, a wireless device includes a memory storing instructions, and a processor reading the instructions from the memory and executing the instructions for operating the wireless device in a wireless network. The instructions include instructions for maintaining, at the wireless device, an array of network access vectors (NAVs) in which each NAV comprises a timer scheme for performing virtual carrier sensing on a corresponding lower bandwidth channel, instructions for receiving, from an access point of the first BSS, a control message for responding to the access point with a channel occupancy status message, instructions for checking one or more NAVs corresponding to one or more lower bandwidth channel identified by the request, and instructions for responding to the control message based on indication of channel occupancy from the one or more NAVs.

Figure 13:
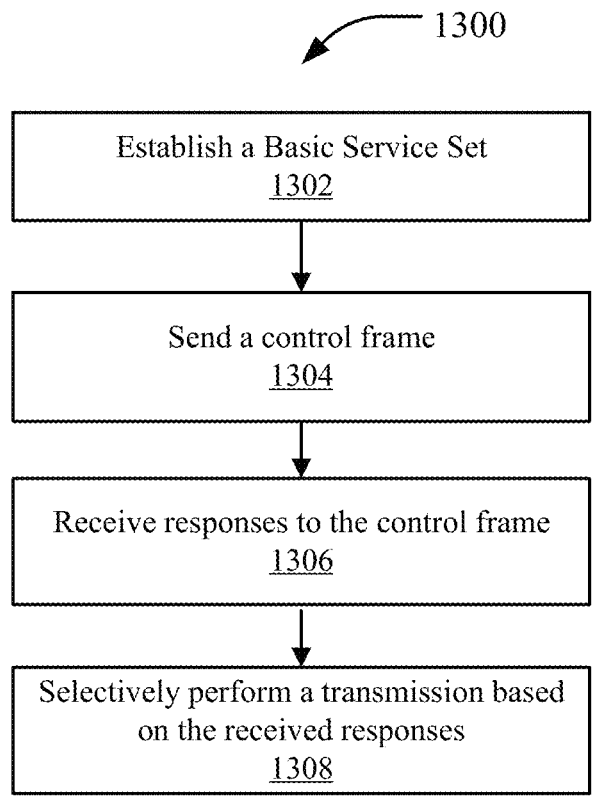
FIG. 13 is a flowchart of an example method of wireless communication implemented at an access point.

FIG. 13 shows a flowchart for an example method 1300 of wireless communication. The method 1300 may be implemented at an AP.

The method 1300 includes, at 1302, establishing a basic service set for providing wireless connectivity using a broadband wireless channel comprising multiple lower bandwidth channels to a group of stations, wherein one of the multiple bandwidth channels is a primary channel and remaining multiple lower bandwidth channels are secondary channels.

The method 1300 includes, at 1304, sending, over the primary channel, a control frame to the group of stations. In some embodiments, along with the primary channel, the control frame may also be transmitted with one or more additional secondary channels. In some embodiments, the control frame may include occupancy status of some or all of the multiple lower bandwidth channels. While the AP may send the control frame, e.g., an RTS, over multiple channels, STAs may only listen to their primary channel. Other STAs may listen to this RTS on the secondary channel if the secondary channel of their BSS is configured as a primary channel for another BSS. In some embodiments, The channel occupancy indication may be included in PHY header of any frame (including RTS, CTS, or other frame). When other STA receives the PPDU in primary channel, it can know which secondary channels is occupied by this PPDU. So it does not need to check secondary channel. For example, according to the current 802.11 specification, if the primary channel is busy, the STA would not check the secondary channel.

The method 1300 includes, at 1306, receiving, from the group of stations, responses to the control frame, wherein each response includes occupancy status of some or all of the multiple lower bandwidth channels.

The method 1300 includes, at 1308, selectively, based on the responses, performing a subsequent transmission using some of the multiple lower bandwidth channels.

In some embodiments, the control message includes a frame control field, a duration field, a receiving address (RA) field, a transmitting address (TA) field indicating an identity of the access point, or a list of group stations field. In some embodiments, the group of stations includes stations having a same target wakeup time, and the transmitting the control message includes setting the RA field to indicate the group of stations so as to trigger the group of stations to respond the control frame simultaneously within a predetermined time interval.

In some embodiments of method 1300, the transmitting operation includes setting the RA field to TA and separately including a listing of the group of stations to trigger those stations to respond the control frame simultaneously. In some embodiments, receiving the first number of response messages includes monitoring a wireless channel for a legacy preamble and decoding one or more response frames when the legacy preamble is detected and identifying the responding stations from the uniquely distinguishable identifier included in the received responses.

In some embodiments, an apparatus for use in a wireless network comprising an access point and a group of stations, includes a memory and a processor that reads instructions from the memory and implements a method of controlling group transmissions in the wireless network, e.g., as described with respect to the method 1300.

According to some embodiments disclosed herein, an AP can thus transmit an MU-RTS message to trigger MU-CTS transmissions from multiple STAs in the same format; the multiple STAs may be legacy STAs that do not support and follow the MU feature, or may be HE STAs. The MU-RTS message may have either a short format (e.g., FIG. 4) or may have long format (FIG. 7). In the short format of MU-RTS, the STAs are addressed using a group address. In the long format message, the AP may include one of (i) the receiving STA's AID and OID, or (ii) the receiving STA's AID only, or (iii) AID=0, and a number indicative of the total number of allocated RUs for random access.

According to some embodiments disclosed herein, when an STA receives an MU-RTS message, it may respond with an MU-CTS message in a format that is specified by the MU-RTS. The MU-CTS format may contain the legacy preamble+the orthogonal sequence information used to identify the responding STA ID. The MU-CTS may be in the legacy CTS format. The present document also discloses certain conditions that may be satisfied by the MU-CTS transmission.

With respect to updating NAV, the following rules may be used an NAV array may be maintained in the memory of a device for tracking the occupancy of each frequency channel. The STA may maintain one or more NAV arrays for myBSS and/or OBSS. Also, devices may update NAV array(s) according to received MU-RTS and MU-CTS information to protect the transmission in myBSS or OBSS over different frequency channel.

In some embodiments, e.g., as described with respect to FIG. 4 to FIG. 7, a method of controlling transmission opportunities for multiple wireless devices in a wireless network having a shared transmission medium, wherein the multiple wireless devices include at least one legacy wireless device that follows a legacy message syntax and at least one high efficiency wireless device that follows a multi-user message syntax, the method implemented by an access point of the wireless network, includes transmitting, from the access point, a multi-user request-to-send (MU-RTS) message having one of a short format or a long format identifying wireless devices that are to respond to the MU-RTS message, receiving, by the access point, from at least one wireless device, a message in response to the MU-RTS message. In the short format, the wireless devices that are to respond are identified using a group identifier. In the long format, the wireless devices that are to respond are identified using association identifiers or orthogonal identifiers. In some embodiments, the long format comprise a first portion that is understood by both the legacy wireless device and the high efficiency wireless device for setting network allocation vectors thereof, and a second portion that is understood only by the high efficiency wireless device. In some embodiments, the orthogonal identifier use orthogonal sequences that uniquely identify each wireless device (e.g., a Zadoff-Chu sequence). As described herein, the identifying wireless devices that are to respond includes identifying that the wireless devices are to respond using random access by setting an association identifier field in the MU-RTS message to zero. In some embodiments, a wireless communication apparatus include a memory storing processor-executable code, a processor and a network interface, wherein the code includes instructions for implementing this method, including instructions for transmitting, from the wireless communication apparatus over the wireless network interface, a multi-user request-to-send (MU-RTS) message having one of a short format or a long format identifying wireless devices that are to respond to the MU-RTS message, and receiving, by the wireless communication apparatus via the wireless network interface, a message in response to the MU-RTS message.

With reference to FIG. 4 to FIG. 9 and other techniques described herein, in some embodiments, a method of performing a wireless transmission from a wireless device that is being managed by an access point of a basic service set in a wireless local area network includes receiving and processing a multi-user request-to-send (MU-RTS) message that specifies a format to be used for a subsequent clear-to-send transmission and identifies wireless devices that are to respond to the MU-RTS message, making a determination of whether the wireless device has an uplink protocol data unit or an uplink message transmission to transmit, and selectively performing an uplink transmission based on the determination and based on a format and a medium access method specified by the MU-RTS. In some embodiments, the medium access method is a random access method when an association identifier field in the MU-RTS message has a zero value. The MU-RTS message may use a short format or a long format, as decided upon by the access point.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
receiving, by a wireless station from an access point, a request message about usage of multiple lower bandwidth channels,
wherein the wireless station is configured to perform transmissions using one or more of the multiple lower bandwidth channels included in a broadband wireless channel,
wherein each of the multiple lower bandwidth channels has a bandwidth that is lower than that of the broadband wireless channel; and
transmitting, by the wireless station, a response message that includes a channel usage indication (CUI) related bitmap that indicates a channel occupancy condition of each channel of the multiple lower bandwidth channels.

2. The method of claim 1,
wherein the CUI related bitmap includes multiple bits that are respectively mapped to channel occupancy conditions of the multiple lower bandwidth channels,
wherein a binary value of each of the multiple bits indicates channel availability for the channel occupancy condition.

3. The method of claim 2, wherein the CUI related bitmap comprises 8-bits.

4. The method of claim 1, wherein each of the multiple lower bandwidth channels is a 20 MHz channel or a 40 MHz channel.

5. The method of claim 1, wherein the broadband wireless channel has a bandwidth of 40 MHz, 80 MHz, or 160 MHz.

6. The method of claim 1, wherein the request message includes a frame control field and a duration field.

7. The method of claim 1, wherein the request message includes a receiving address (RA) field that indicates an address associated with the wireless station, and a transmitting address (TA) field that indicates an identity of the access point.

8. A wireless communication method, comprising:
transmitting, by an access point to a wireless station, a request message about usage of multiple lower bandwidth channels,
wherein the access point is configured to perform receptions using one or more of the multiple lower bandwidth channels included in a broadband wireless channel,
wherein each of the multiple lower bandwidth channels has a bandwidth that is lower than that of the broadband wireless channel; and
receiving, by the access point, a response message that includes a channel usage indication (CUI) related bitmap that indicates a channel occupancy condition of each channel of the multiple lower bandwidth channels.

9. The method of claim 8,
wherein the CUI related bitmap includes multiple bits that are respectively mapped to channel occupancy conditions of the multiple lower bandwidth channels,
wherein a binary value of each of the multiple bits indicates channel availability for the channel occupancy condition.

10. The method of claim 9, wherein the CUI related bitmap comprises 8-bits.

11. The method of claim 8, wherein each of the multiple lower bandwidth channels is a 20 MHz channel or a 40 MHz channel.

12. The method of claim 8, wherein the broadband wireless channel has a bandwidth of 40 MHz, 80 MHz, or 160 MHz.

13. The method of claim 8, wherein the request message includes a frame control field and a duration field.

14. The method of claim 8, wherein the request message includes a receiving address (RA) field that indicates an address associated with the wireless station, and a transmitting address (TA) field that indicates an identity of the access point.

15. A wireless communication apparatus comprising a memory and a processor, the memory includes instructions that upon execution by the processor causes the wireless communication apparatus to:
receive, by a wireless station from an access point, a request message about usage of multiple lower bandwidth channels,
wherein the wireless station is configured to perform transmissions using one or more of the multiple lower bandwidth channels included in a broadband wireless channel,
wherein each of the multiple lower bandwidth channels has a bandwidth that is lower than that of the broadband wireless channel; and
transmit, by the wireless station, a response message that includes a channel usage indication (CUI) related bitmap that indicates a channel occupancy condition of each channel of the multiple lower bandwidth channels.

16. The wireless communication apparatus of claim 15,
wherein the CUI related bitmap includes multiple bits that are respectively mapped to channel occupancy conditions of the multiple lower bandwidth channels,
wherein a binary value of each of the multiple bits indicates channel availability for the channel occupancy condition.

17. The wireless communication apparatus of claim 16, wherein the CUI related bitmap comprises 8-bits.

18. A wireless communication apparatus comprising a memory and a processor, the memory includes instructions that upon execution by the processor causes the wireless communication apparatus to:
transmit, by an access point to a wireless station, a request message about usage of multiple lower bandwidth channels,
wherein the access point is configured to perform receptions using one or more of the multiple lower bandwidth channels included in a broadband wireless channel,
wherein each of the multiple lower bandwidth channels has a bandwidth that is lower than that of the broadband wireless channel; and
receive, by the access point, a response message that includes a channel usage indication (CUI) related bitmap that indicates a channel occupancy condition of each channel of the multiple lower bandwidth channels.

19. The wireless communication apparatus of claim 18,
wherein the CUI related bitmap includes multiple bits that are respectively mapped to channel occupancy conditions of the multiple lower bandwidth channels,
wherein a binary value of each of the multiple bits indicates channel availability for the channel occupancy condition.

20. The wireless communication apparatus of claim 19, wherein the CUI related bitmap comprises 8-bits.

\* \* \* \* \*